United States Patent
Rephlo

(10) Patent No.: US 10,580,027 B1
(45) Date of Patent: Mar. 3, 2020

(54) SYSTEMS AND METHODS FOR TRANSACTION-SPECIFIC REWARDS NEGOTIATION

(71) Applicant: Capital One Services, LLC, McLean, VA (US)

(72) Inventor: Jeremy Rephlo, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/182,657

(22) Filed: Nov. 7, 2018

(51) Int. Cl.
*G06Q 30/02* (2012.01)
*G06Q 30/08* (2012.01)
*G06Q 20/20* (2012.01)

(52) U.S. Cl.
CPC ....... *G06Q 30/0222* (2013.01); *G06Q 20/206* (2013.01); *G06Q 30/08* (2013.01)

(58) Field of Classification Search
None
See application file for complete search history.

(56) References Cited

U.S. PATENT DOCUMENTS

| | | | |
|---|---|---|---|
| 7,318,049 B2 | 1/2008 | Iannacci | |
| 8,510,159 B2 | 8/2013 | Postrel | |
| 8,892,462 B1* | 11/2014 | Borovsky | G06Q 20/204 705/17 |
| 10,026,117 B1* | 7/2018 | Arbel | G06Q 30/08 |
| 2002/0077890 A1 | 6/2002 | LaPointe | |
| 2010/0088149 A1* | 4/2010 | Sullivan | G06Q 20/20 705/14.65 |
| 2011/0166922 A1 | 7/2011 | Fuerstenberg | |
| 2012/0005076 A1* | 1/2012 | Dessert | G06Q 20/10 705/39 |
| 2013/0311266 A1 | 11/2013 | Vichich | |
| 2015/0058206 A1* | 2/2015 | Blackhurst | G06Q 20/102 705/39 |
| 2015/0332246 A1* | 11/2015 | Lafeer | G06Q 20/3572 705/44 |

OTHER PUBLICATIONS

"Can I change payment source of a pending transaction?" (published online at https://www.paypal-community.com/t5/Sending-money-Archive/Can-I-change-payment-source-of-a-pending-transaction/td-p/216106 on Mar. 17, 2011) (Year: 2011).*

* cited by examiner

*Primary Examiner* — James M Detweiler
(74) *Attorney, Agent, or Firm* — Troutman Sanders LLP; Christopher J. Forstner; John A. Morrissett

(57) ABSTRACT

A method of providing rewards-based payment method selection includes storing a plurality of payment account numbers in association with a tokenized financial account number. The method includes receiving user rewards preferences and a primary transaction authorization request. The method also includes generating a plurality of provisional transaction authorization requests and transmitting the provisional transaction authorization requests to one or more payment authorization servers. The method further includes receiving a plurality of provisional transaction authorizations and selecting a preferred payment account number based on the user rewards preferences. The method also includes transmitting a transaction authorization message to the merchant POS terminal to authorize the attempted transaction based on a provisional transaction authorization.

12 Claims, 6 Drawing Sheets

SYSTEMS AND METHODS FOR TRANSACTION-SPECIFIC REWARDS NEGOTIATION

FIELD OF INVENTION

The present disclosure relates to systems and methods for providing rewards-based payment method selection, and more particularly providing a system for allowing a plurality of financial transaction card issuers to bid on rewards granted to a cardholder in association with a purchase.

BACKGROUND

It is common practice for issuers of financial transaction cards, such as credits cards, to host associated rewards programs that may provide cash back, air miles, redeemable points, or other such value to a customer based on the customer's use of the card. For example, a credit card may offer 1% cash back on every purchase made using the card, which may accrue over time and may be redeemed by the customer in the form of a check, a deposit or a credit to an account balance. Some credit card issuers may offer tiered rewards or rewards that are tied to specific merchants or types of merchants. For example, a credit card may offer 1% cashback on general purchases, but 3% cash back for purchases made a grocery stores and gas stations. Some credit cards may have rewards programs in which the rewards change over time, by for example, in addition to offering 1% back on all purchases generally, offering 5% cash back on purchases made a gas stations during a first specified calendar period and then upon entering a second specified calendar period the 5% cash back may change such that it is now awarded in association with purchases made a movie theaters (and no longer gas stations). Credit card issuers generally offer such rewards programs in an attempt to both gain and retain customer use of a particular card. Accordingly, there is a significant amount of competition between card issuers to entice customers to enroll and use their credit cards.

Although there is significant competition to obtain and retain such credit card customers, some customers may be more desirable to obtain and retain than others. For example, factors such as the frequency and/or amount of a customer's purchases, the types of merchants a customer typically frequents, and the amount (if any) of a balance a customer carries on their account from month to month may all impact a card issuer's fees obtained from use of the card. In some instances, card issuers may have different arrangements with different merchants such that a card issuer may receive greater fees per dollar spent at one type of merchant versus another type of merchant. Therefore, it may be beneficial for a card issuer to be able to offer personalized rewards to individual customers based on the customer's past financial behavior. Furthermore, because many customers may have multiple credit cards with differing rewards programs, it may also be beneficial for a card issuer to be able to offer customized rewards based on individual purchases at particular merchants to entice a customer to use their card versus the card of a competitor on a particular purchase. Moreover, in a case where a customer has multiple credit cards with differing rewards programs, it may be beneficial to a customer to allow the customer to receive customized rewards offers from multiple card issuers in association with a purchase so that the customer may maximize their preferred rewards returns.

Accordingly, there is a need for improved systems and methods to allow financial transaction card issuers to offer customized rewards to an individual on a purchase by purchase basis. Embodiments of the present disclosure are directed to this and other considerations.

SUMMARY

Disclosed embodiments provide systems and methods for providing rewards-based payment method selection.

Consistent with the disclosed embodiments, a method of providing rewards-based payment method selection. The method may include storing a plurality of payment account numbers in association with a tokenized financial account number. Each payment account number of the plurality of payment account numbers may be associated with a purchase-based rewards program. The method may include receiving user rewards preferences associated with the tokenized financial account number. The method may include receiving a primary transaction authorization request generated by the merchant POS terminal from a merchant POS terminal and based on an attempted transaction made in association with the tokenized financial account number. The method may include generating a plurality of provisional transaction authorization requests based on the primary transaction authorization request and the plurality of financial account numbers. Each of the plurality of provisional transaction authorization requests may correspond to one of the plurality of payment account numbers. The method may include transmitting the plurality of provisional transaction authorization requests to one or more payment authorization servers. The method may include receiving, from the one or more payment authorization servers, a plurality of provisional transaction authorizations. Each of the plurality of provisional transaction authorizations may correspond to one of the plurality of payment account numbers and may include a respective rewards bid associated with the attempted transaction. The method may include selecting a preferred payment account number based on the user rewards preferences and the respective rewards bids associated with the plurality of provisional transaction authorizations. The preferred payment account number may be one of the plurality of payment account numbers corresponding to a provisional transaction authorization. The method may further include transmitting a transaction authorization message to authorize the attempted transaction to the merchant POS terminal and based on a provisional transaction authorization of the plurality of provisional transaction authorizations corresponding to the preferred payment account number.

Consistent with the disclosed embodiments, systems and non-transitory computer-readable mediums for providing rewards-based payment method selection are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
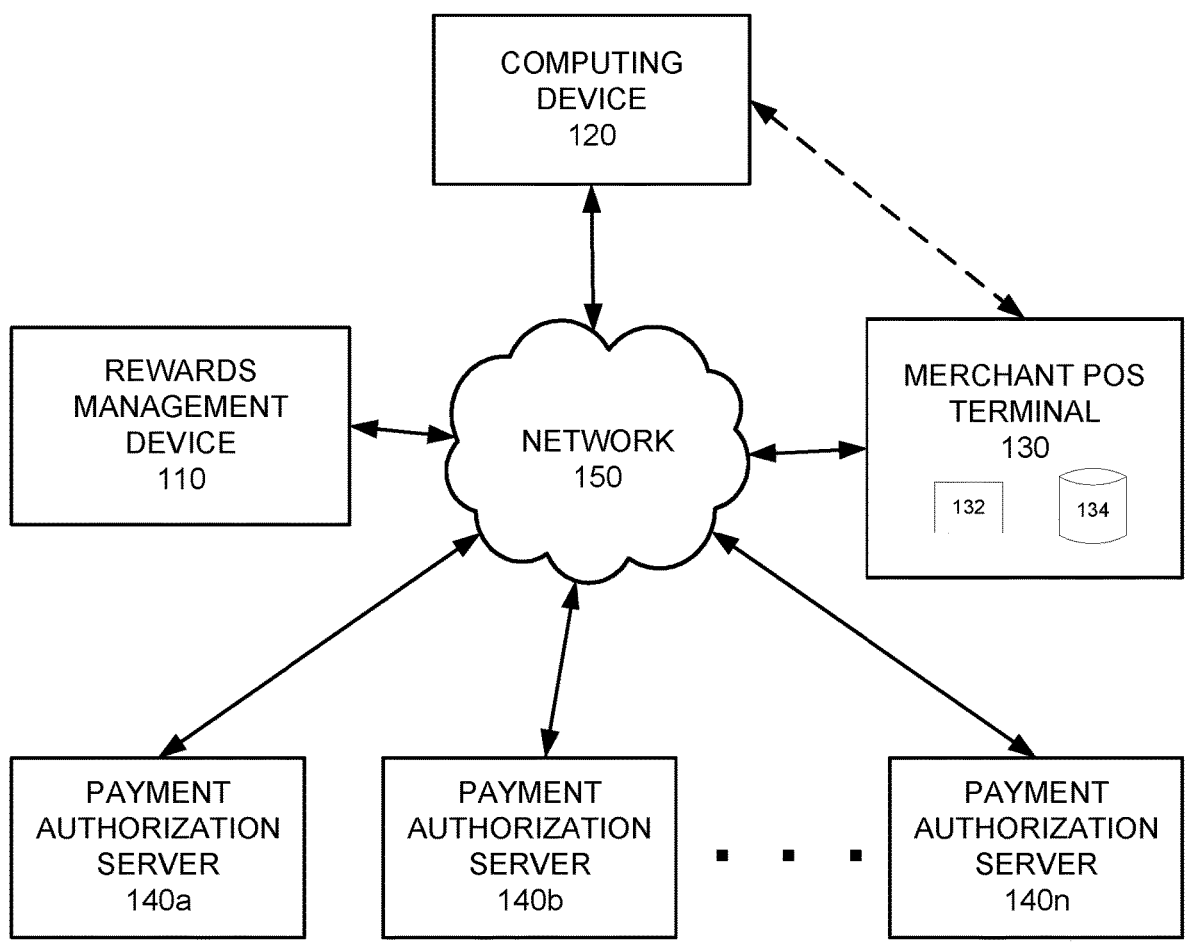
FIG. 1 is a diagram of an exemplary system that may be used to provide rewards-based payment method selection.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing rewards-based payment method selection. In one embodiment, a method may include storing a plurality of payment account numbers in association with a tokenized financial account number. Each payment account number of the plurality of payment account numbers may be associated with a purchase-based rewards program. The method may include receiving user rewards preferences associated with the tokenized financial account number. The method may include receiving a primary transaction authorization request generated by the merchant POS terminal from a merchant POS terminal and based on an attempted transaction made in association with the tokenized financial account number. The method may include generating a plurality of provisional transaction authorization requests based on the primary transaction authorization request and the plurality of financial account numbers. Each of the plurality of provisional transaction authorization requests may correspond to one of the plurality of payment account numbers. The method may include transmitting the plurality of provisional transaction authorization requests to one or more payment authorization servers. The method may include receiving, from the one or more payment authorization servers, a plurality of provisional transaction authorizations. Each of the plurality of provisional transaction authorizations may correspond to one of the plurality of payment account numbers and may include a respective rewards bid associated with the attempted transaction. The method may include selecting a preferred payment account number based on the user rewards preferences and the respective rewards bids associated with the plurality of provisional transaction authorizations. The preferred payment account number may be one of the plurality of payment account numbers corresponding to a provisional transaction authorization. The method may further include transmitting a transaction authorization message to authorize the attempted transaction to the merchant POS terminal and based on a provisional transaction authorization of the plurality of provisional transaction authorizations corresponding to the preferred payment account number.

In another embodiment, a method for providing rewards-based payment method selection is provided. The method may include storing a plurality of payment account numbers in association with a tokenized financial account number. Each payment account number of the plurality of payment account numbers may be associated with a purchase-based rewards program. The method may include receiving, from a merchant POS terminal, a primary transaction authorization request generated by the merchant POS terminal based on an attempted transaction made in association with the tokenized financial account number. The method may include generating, based on the primary transaction authorization request and the plurality of financial account numbers, a plurality of provisional transaction authorization requests. Each of the plurality of provisional transaction authorization requests may correspond to one of the plurality of payment account numbers. The method may include transmitting the plurality of provisional transaction authorization requests to one or more payment authorization servers. The method may include receiving a plurality of provisional transaction authorizations from the one or more payment authorization servers. Each of the plurality of provisional transaction authorizations may correspond to one of the plurality of payment account numbers. The method may include receiving, from the one or more payment authorization servers, a plurality of rewards bids. Each rewards bid of the plurality of rewards bids may be associated with a respective payment account number of the plurality of payment account numbers that corresponds to one of the plurality of provisional transaction authorizations. The method may include transmitting one or more of the plurality of rewards bids to a user device. The method may include receiving, from the user device, an indication of a selection of a preferred payment account number from among the plurality of payment account numbers. The preferred payment account number may correspond to a payment account number that is associated with one of the one or more of the plurality of rewards bids. The method may further include transmitting a transaction authorization message to authorize the attempted transaction to the merchant POS terminal and based on a provisional transaction authorization corresponding to the preferred payment account number.

In another embodiment, a method for providing rewards-based payment method selection is provided. The method may include storing a plurality of payment account numbers in association with a tokenized financial account number. Each payment account number of the plurality of payment account numbers may be associated with a purchase-based rewards program. The method may include receiving, from a merchant POS terminal, a primary transaction authorization request generated by the merchant POS terminal based on an attempted transaction made in association with the tokenized financial account number. The method may include generating, based on the primary transaction authorization request and the plurality of financial account numbers, a plurality of provisional transaction authorization requests. Each of the plurality of provisional transaction authorization requests may correspond to one of the plurality of payment account numbers. The method may include transmitting the plurality of provisional transaction authorization requests to one or more payment authorization servers. The method may include receiving, from the one or more payment authorization servers, a plurality of provisional transaction authorizations. Each of the plurality of provisional transaction authorizations may correspond to a respective payment account number of the plurality of payment account numbers. The method may include transmitting, to the merchant POS terminal and based on the plurality of provisional transaction authorizations, a temporary transaction authorization message to authorize the attempted transaction. The method may include receiving a transaction execution message from the merchant POS terminal indicating that the attempted transaction has been executed. The method may include receiving a plurality of rewards bids associated with the payment account numbers corresponding to the plurality of provisional transaction authorizations. The method may include transmitting the plurality of rewards bids corresponding to the provisional transaction authorizations to a user device. The method may further include responsive to receiving, from the user device and after receiving the transaction execution message, an indication of a selection of a preferred payment account number from among the plurality of payment account numbers that correspond to the rewards bids, transmitting a transaction settlement message to the merchant POS terminal and based on a provisional transaction authorization corresponding to the preferred payment account number.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary transaction rewards management system 100 that may be configured to perform one or more processes that may allow a plurality of financial transaction card issuers to provide rewards bids in relation to one or more transactions. For example, as described in greater detail below, in response to an attempted transaction (e.g., a purchase) made by a customer using a first financial transaction card (e.g., a first credit card) at a merchant, the system 100 may generate multiple payment authorization requests the correspond to multiple different financial transaction cards and/or payment accounts that are each associated with a respective rewards program. In response, the system 100 may receive a plurality of provisional transaction authorization requests that each include a corresponding rewards bid that represents a rewards offer associated with the attempted transaction. The system 100 may, with or without user input, select a particular financial transaction card or payment account to complete the purchase, based on the rewards bids offered by the respective financial institutions associated with the various payment options. In this way, the system 100 may enable financial transaction card issuers to compete to be the selected financial transaction card and/or payment processor used to execute the customer's attempted transaction. Further, the system 100 may allow the customer to specify rewards preferences that may allow the customer to optimize the received rewards based on the nature of the attempted transaction. The components and arrangements shown in FIG. 1 are not intended to limit the disclosed embodiments as the components used to implement the disclosed processes and features may vary.

In accordance with disclosed embodiments, transaction rewards management system 100 may include a rewards management device 110 in communication with a computing device 120 (or a plurality of computing devices 120), a merchant POS terminal 130, and a plurality of payment authorization servers 140a-n (collectively, payment authorization servers 140) via network 150. Computing device 120 may be a mobile computing device (e.g., a smart phone, tablet computer, smart wearable device (e.g., augmented/virtual reality headset), portable laptop computer, voice command device, or other mobile computing device) or a stationary computing device (e.g., a stationary desktop or other stationary computer). Computing device 120 may belong to or be provided by a consumer, or may be borrowed, rented, or shared. In some embodiments, computing device 120 may be configured to provide one or more of an augmented reality and a virtual reality experience to one or more users, and may be equipped with a display, speakers or other auditory devices, tactile simulators, and other devices configured to engage the user's senses to enhance the augmented/virtual reality experience.

In some embodiments, transaction rewards management system 100 may also include merchant POS terminal 130 that may communicate with other devices of system 100 via network 150. In some embodiments, merchant POS terminal 130 may communicate directly with computing device 120 (e.g., via wired or wireless communication). Further, in some embodiments, transaction rewards management system 100 may include the plurality of payment authorization servers 140a-140n that may communicate with other devices of system 100 via network 150. According to some embodiments, each payment authorization server 140 may be associated with and/or controlled by a payment card issuer that may issue payment cards (which may be alternatively referred to herein as financial transaction cards), such as credit cards, debit cards, gift cards, and the like, which may have an associated purchase-based rewards program. For example, a first payment card issuer may issue a credit card that provides cash back rewards of 2% on every purchase, a second payment card issuer may issue a credit card that provides cash back rewards of 5% on one or more specified categories of purchases, a third payment card issuer may issue a credit card that provides a predetermined number of air miles as a reward for every dollar spent on the card, and so on. Although the present disclosure refers to a plurality of payment authorization servers 140 (e.g., 140a-140n) associated with a plurality of payment card issuers, it is contemplated that in some embodiments, a single payment authorization server 140a may service multiple different payment card issuers and/or different types of payment cards such that in some embodiments, a single payment authorization server 140a may perform the functions described herein with respect to the plurality of payment authorization servers 140a-140n.

Network 150 may be of any suitable type, including individual connections via the internet such as cellular or WiFi networks. In some embodiments, network 150 may connect terminals using direct connections such as radio-frequency identification (RFID), near-field communication (NFC), Bluetooth®, low-energy Bluetooth® (BLE), WiFi™, ZigBee®, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
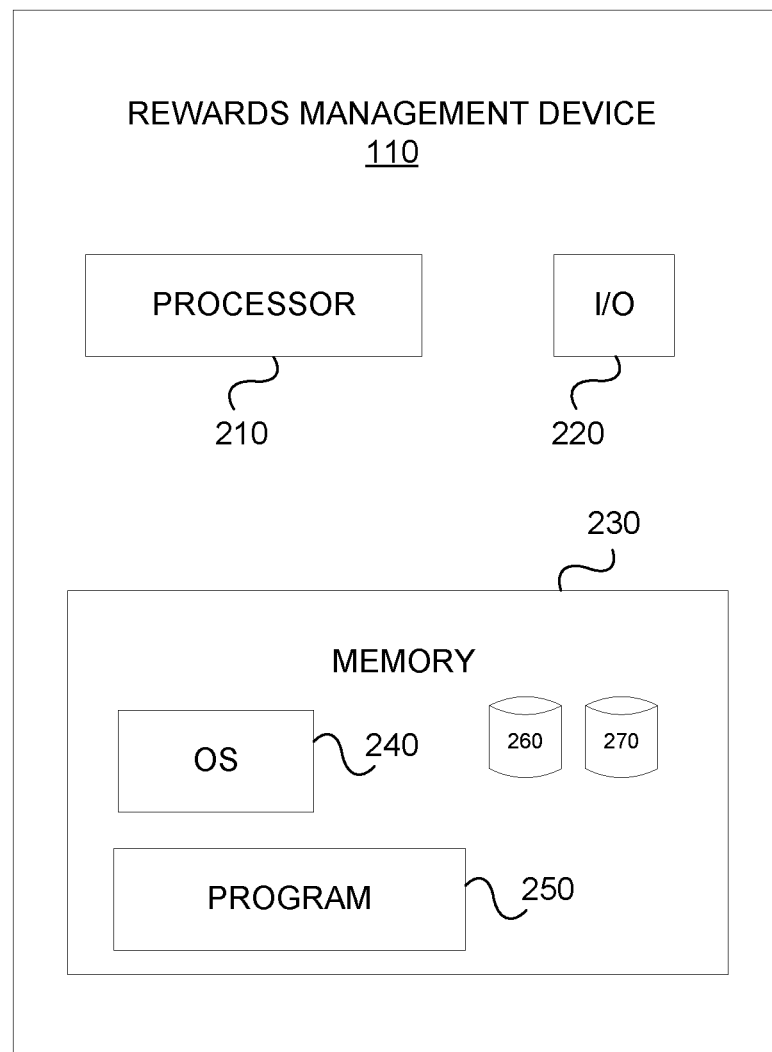
FIG. 2 is a component diagram of an exemplary rewards management device.

An exemplary embodiment of rewards management device 110 is shown in more detail in FIG. 2. In some embodiments, one or more of computing device 120, merchant POS terminal 130 and payment authorization servers 140a-140n may have a similar structure and components that are similar to those described with respect to rewards management device 110. As shown, rewards management device 110 may include a processor 210, an input/output ("I/O") device 220, a memory 230 containing an operating system ("OS") 240 and a program 250. For example, rewards management device 110 may be a single server or may be configured as a distributed computer system including multiple servers or computers that interoperate to perform one or more of the processes and functionalities associated with the disclosed embodiments. In some embodiments, the rewards management device 110 may further include a peripheral interface, a transceiver, a mobile network interface in communication with the processor 210, a bus configured to facilitate communication between the various components of the rewards management device 110, and a power source configured to power one or more components of the rewards management device 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth®, low-energy Bluetooth® (BLE), WiFi™, ZigBee®, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Rewards management device 110 may include one or more storage devices configured to store information used by processor 210 (or other components) to perform certain functions related to the disclosed embodiments. In one example, rewards management device 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, rewards management device 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, rewards management device 110 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a cardholder database 260 and a customer preferences database 270 for storing related data to enable rewards management device 110 to perform one or more of the processes and functionalities associated with the disclosed embodiments. Cardholder database 260 may include stored data relating to financial transaction card numbers or other payment account numbers that are associated with a customer. For example, cardholder database 260 may store a plurality of credit card numbers that are associated with one or more customers. In some embodiments, cardholder database 260 may also store one or more tokenized financial account numbers that are associated with a customer and/or a number of financial transaction cards issued by one or more financial transaction card issuers. For example, a customer may have a tokenized financial account number that may be associated with a plurality of payment card account numbers, such that in response to conveying the tokenized financial account number to merchant POS terminal 130, the customer may be presented with the option to select one of the associated payment account numbers to execute the transaction. For example, cardholder database 260 may store records that indicate that a first customer has credit cards A, B, and C, which are all associated with a tokenized financial account number, such that when the customer conveys the tokenized financial account number to merchant POS terminal 130 in association with an attempted transaction, the transaction may be executed, either automatically (e.g., based on previously submitted preferences) or based on a user input, using one of credit cards A, B, or C. Similarly, in some embodiments, cardholder database 260 may associate a plurality of payment account numbers of a customer with one another so that they may be presented as alternatives in response to attempted transaction using one of them. For example, if the customer of the previous example swipes card A at merchant POS terminal 130, the system may determine that credit cards B and C are stored in association with card A and the system may be configured to automatically select one of cards A, B and C for use in executing the transaction or present the customer with the option of selecting one of the cards A, B or C (e.g., via a mobile application on computing device 120). According to some embodiments, cardholder database 260 may also store rewards program information that is associated with each payment card or payment account number. For example, cardholder database may store information that indicates that credit card A provides 2% cash back on all purchases, credit card B provides 5% cash back on purchases made at gas stations and 1% at all other merchants, and credit card C provides 1 air mile per dollar spent. According to some embodiments, cardholder database 260 may be updated intermittently or from time to time by reflect changes in the rewards programs of associated cards, by for example, receiving updates from card issuer systems. Customer preference database 270 may include stored data relating to customer preferences for rewards. For example, customer preferences may indicate that, with respect to rewards programs, a particular customer may value 1 air mile per dollar more than 1% cash back. According to some embodiments, rewards management device 110 may access and use the stored customer preferences to make determinations about which purchase card to use for a transaction based on the nature and amount of the offered rewards with respect to each purchase card. In some embodiments, customer preference database 270 may store relative values of different types of rewards for a particular customer that may be updated based on market conditions. For example, a customer may generally prefer 1% cash back to 1 air mile per dollar, but if the price (in air miles) of air travel is discounted (e.g., based on an airline promotion) such that the relative value of the air miles is increased, then customer preference database 260 may indicate that the customer's preference has changed to value 1 air mile per dollar more than 1% cash back. According to some embodiments, such preferences may be submitted directly by customer (e.g., via a mobile application on computing device 120), derived based on a customer's responses to various survey questions, ascertained through analysis of the customer's purchasing habits and/or specified goals (e.g., save money to buy a car vs. save money/air miles for an airline ticket to Hawaii), or determined based on the customer's past selection of rewards from among various options using machine learning techniques.

Rewards management device 110 may also be communicatively connected to one or more memory devices (e.g., databases (not shown)) locally or through a network. The remote memory devices may be configured to store information and may be accessed and/or managed by rewards management device 110. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Rewards management device 110 may also include one or more I/O devices 220 that may comprise one or more interfaces for receiving signals or input from devices and providing signals or output to one or more devices that allow data to be received and/or transmitted by rewards management device 110. For example, rewards management device 110 may include interface components, which may provide interfaces to one or more input devices, such as one or more keyboards, mouse devices, touch screens, track pads, trackballs, scroll wheels, digital cameras, microphones, sensors, and the like, that enable rewards management device 110 to receive data from one or more users (such as, for example, via computing device 120).

In exemplary embodiments of the disclosed technology, rewards management device 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While rewards management device 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of rewards management device 110 may include a greater or lesser number of components than those illustrated.

Merchant POS terminal 130 may have one or more processors 132 and one or more merchant databases 134, which may be any suitable repository of merchant data. Merchant POS terminal 130 may be located at a physical merchant POS location such as a storefront or a merchant POS terminal 130 may be a website that may receive transaction payment card information via user input. Information stored in merchant POS terminal 130 may be accessed (e.g., retrieved, updated, and added to) via network 150 by one or more devices (e.g., rewards management device 110) of system 100. Merchant database 134 may store information relating to products and services offered by merchants such as pricing, quantity, availability, discounts, reviews, and any other such generally available information that a consumer may utilize in making a purchasing decision. In some embodiments, merchant database 134 may store some or all of the same information or types of information described with respect to cardholder database 260 and/or customer preference database 270, such as financial card numbers and/or payment account numbers (which may include tokenized financial account number(s)) associated with one or more customers and customer preferences for rewards. In some embodiments, merchant POS terminal 150 may use this information in a manner similar to that described with respect to rewards management device 110 to, for example, generate a plurality of provisional transaction authorization requests to be sent to payment authorization servers 140 and/or determine a selection of a payment card to execute a transaction. Accordingly, although his disclosure is generally directed to rewards management device 110 interacting with payment authorization servers 140, it should be understood that in some embodiments, merchant POS terminal 130 may be configured to carry out some or all of the functionality described herein with respect to rewards management device 110. Merchant POS terminal 130 may have one or more POS devices that communicate with one or more devices (e.g., computing device 120) of system 100 via network 150. In some embodiments, POS devices may include one or more sensors, image capture devices, optical scanners, barcode or QR code readers, RFID readers, and communication interfaces to allow merchant POS terminal 130 to communicate with computing device 120 (e.g., via Bluetooth®, near-field communication, Wi-Fi, an Internet connection or the like). For example, a POS device of merchant POS terminal 130 may be capable of wirelessly receiving financial transaction card or account information (e.g., a credit card, a tokenized financial account number, or the like) from a digital wallet of computing device 120. In some embodiments, a POS device of merchant POS terminal 130 may include a card reader that may read a magnetic strip of a credit card or an embedded chip (e.g., an EMV chip) of a credit card.

Figure 3:
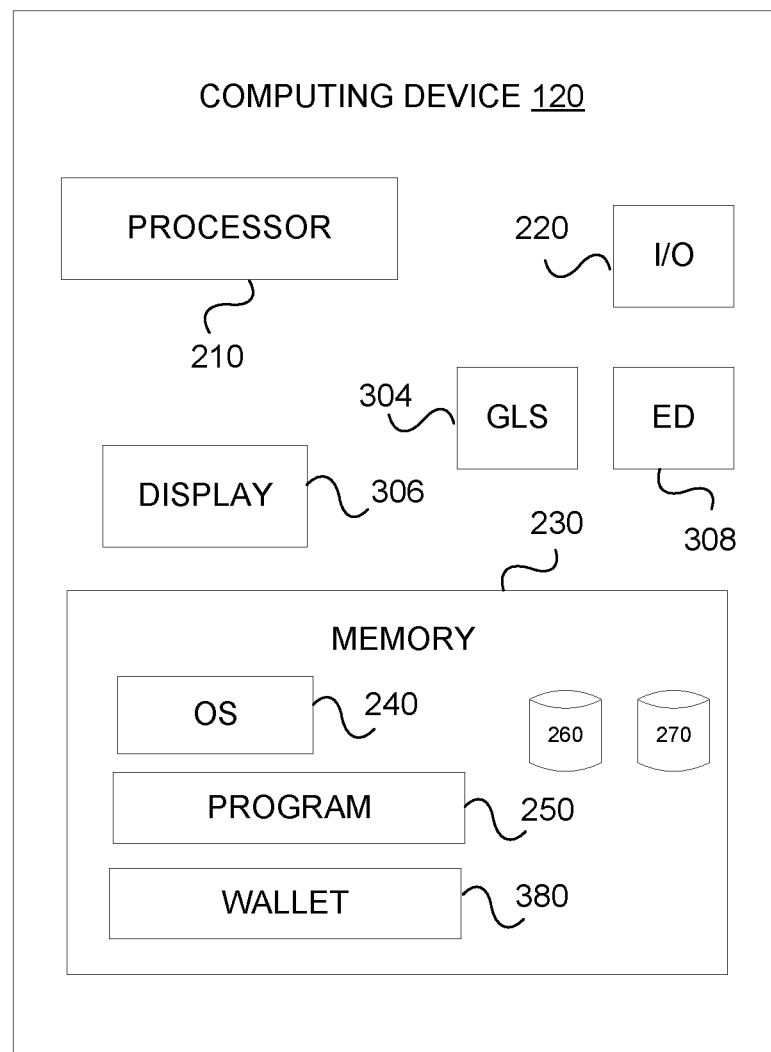
FIG. 3 is a component diagram of an exemplary computing device.

FIG. 3 shows an exemplary embodiment of computing device 120. As shown, first computing device 120 may include input/output ("I/O") device 220, memory 230 containing operating system ("OS") 240 and program 250 and all associated components as described above with respect to rewards management device 110. Computing device 120 may also have one or more processors 210, a geographic location sensor ("GLS") 304 for determining the geographic location of computing device 120, a display 606, which may include one or more of a display screen (such as a smart phone touchscreen) and/or an augmented or virtual reality display (such an augmented/virtual reality headset), and an environmental data ("ED") sensor 308 for obtaining environmental data including audio and/or visual information representing a physical environment. In some embodiments, environmental data sensor 608 may include a microphone or a digital camera. According to some embodiments, memory 230 of computing device 120 may include cardholder database 260 and/or customer preferences database 270 that may store some or all of the same type of information described above with respect to rewards management device 110. Computing device 120 may also include a digital wallet 380. As will be understood by those of skill in the art, digital wallet 380 may be software that provides security and encryption for personal information and account information (such as a credit card number) to allow transactions. For example, digital wallet 380 may store digital representations of one or more credit cards of a user. Digital wallet 380 may be configured to wirelessly convey credit card information (e.g., card number, expiration date, customer name, security code, etc.) and/or authentication information (e.g., pin numbers, biometric verification information, etc.) to merchant POS terminal 130 (e.g., via near-field communication) to facilitate a financial transaction.

According to some embodiments, computing device 120 may include software (e.g., program 250) that may allow a customer to add or remove financial account numbers such as credit card numbers to and from the digital wallet 380. In some embodiments, digital wallet 380 may store one or more tokenized financial account numbers (e.g., a tokenized credit card number). For example, as will be understood by those of skill in the art, a tokenized credit card number may include a surrogate value (i.e., a token) for the primary account number (PAN) of a credit card. Traditionally, a tokenized credit card number may map to a single credit card. However, in some embodiments of the present disclosure, a tokenized credit card number may map to or be associated with a plurality of credit card numbers that may be stored by the system (e.g., by rewards management device 110). In such cases, when a tokenized credit card number is used to initiate a transaction (e.g., via merchant POS terminal 130), the system (e.g., rewards management device 110) may automatically select (e.g., by executing predetermined rules configured to maximized preferred rewards received from a transaction) a credit card associated with the tokenized credit card number to execute the transaction or the system may be configured to present the customer with the option to select a credit card from a group of credit cards associated with the tokenized credit card number. Thus, in some embodiments, computing device 120 may include software that is configured to do one or more of: allow a user to specify which credit cards (or other payment accounts) are associated with a tokenized financial account number, allow a user to input preferences and/or rules that may specify which payment accounts or types of rewards the customer prefers to use under various specified conditions, and present the user with an option to select from a plurality of payment accounts to execute a transaction based on the associated rewards offered by each account (e.g., in response to the system receiving a plurality of provisional transaction authorizations corresponding to the plurality of payment accounts).

Figure 4:
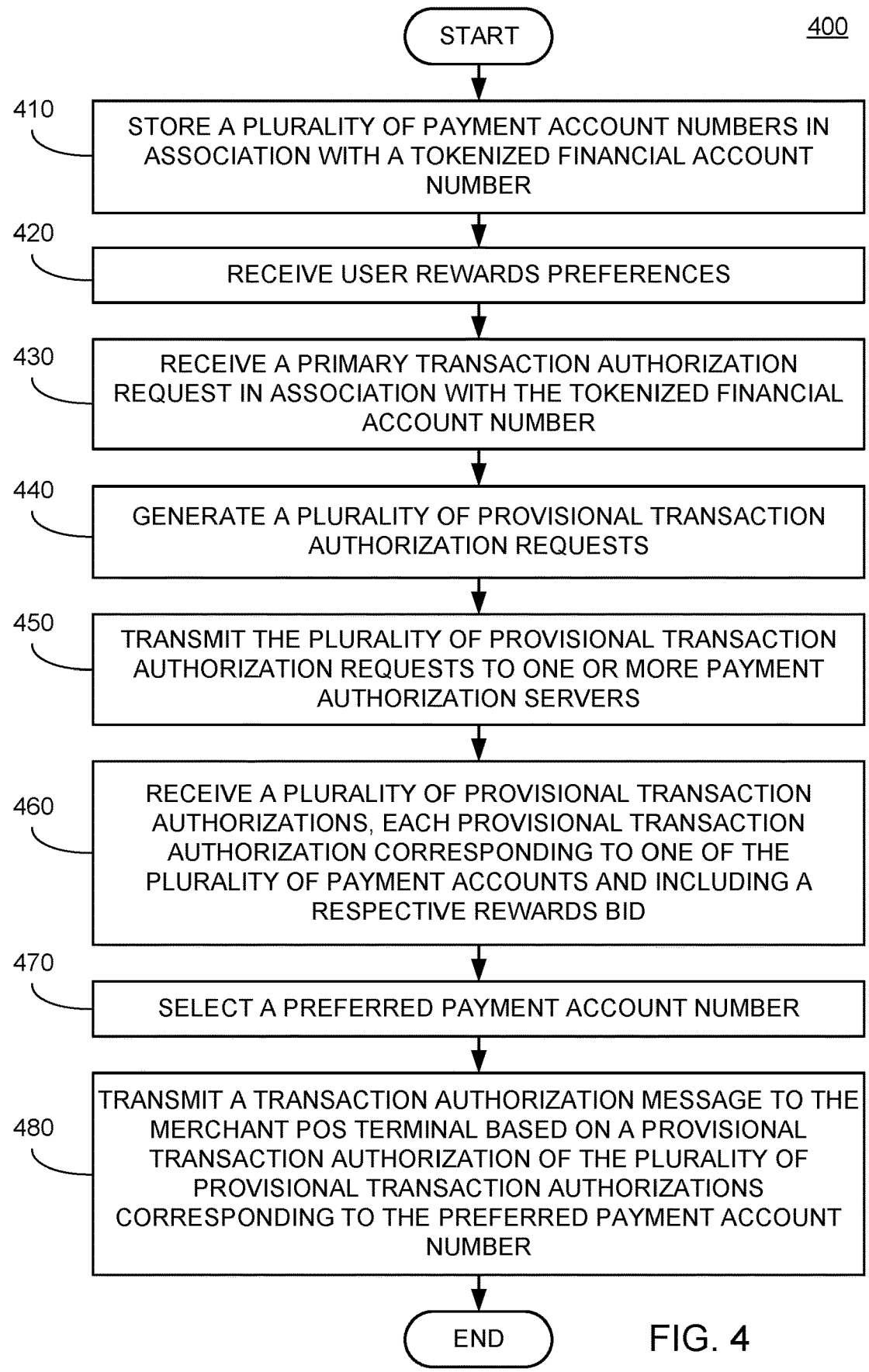
FIG. 4 is a flowchart of an exemplary method for providing rewards-based payment method selection.

FIG. 4 shows a flowchart of method 400 for providing rewards-based payment method selection. Method 400 may be performed by rewards management device 110 using processor 210 to execute memory 230. In some embodiments, steps of method 400 may be delegated to other elements in system 100, such as the computing devices 120, merchant POS terminal 130 and/or payment authorization servers 140 (e.g., 140a-140n). Following method 400, a customer may optimize the rewards received in association with a purchase in response to system 100's facilitation of the placement of rewards bids by a plurality of payment card issuers in association with the transaction.

At block 410, the system (e.g., via rewards management device 110) may store a plurality of payment account numbers in association with a tokenized financial account number. For example, rewards management device 110 may store multiple credit card numbers that are associated with a particular customer. According to some embodiments, rewards management device 110 may receive user inputs (e.g., via computing device 120) that may allow a user to specify payment account numbers (e.g., credit card numbers) that the user is associated with or owns. In some embodiments, this information may be received from computing device 120, in response to, for example, computing device 120 taking digital images of a user's credit cards or otherwise inputting credit card information into computing device 120 and/or digital wallet 280. In some embodiments, rewards management device 110 may store a tokenized credit card number that is associated with the stored multiple credit card numbers such that receipt and processing of the tokenized credit card in association with an attempted transaction may cause rewards management device 110 to automatically select or provide the customer with the ability to select one of the multiple stored credit cards to execute the transaction. According to some embodiments, each payment account number of the plurality of payment account numbers may be associated with a purchase-based rewards program. For example, a first credit card number may be associated with a 1% cash back rewards program, a second credit card number may be associated with an air miles rewards program, and a third credit card number may be associated with a rewards program that provides rewards points that may be redeemed for items, services or credits against account balances. It will be appreciated that these are merely examples and that there may be any number of different types of rewards programs that may provide different types of rewards (i.e., cash back, air miles, redeemable points, account credits, or other such types of rewards), rates of rewards, conditions under which earned rewards may vary, terms of rewards programs (e.g., expiration of rewards, balance payment requirements for earning rewards, rewards points values based on use (e.g., a point used on travel may be worth twice as much of a point used on purchase of goods), initial spend bonuses (e.g., if a user spends more than $1000 in the first three months of opening the card they will receive a bonus), and other such differences) or other such rewards program information. In some embodiments, rewards management device 110 may be configured to communicate with card issuer systems to receive such rewards program information and/or rewards types. For example, rewards management device 110 may intermittently (e.g., once a day, once a week, once a month, etc.) communicate with card issuer servers associated with stored payment account numbers to receive and/or update the nature of the rewards earned by the card (i.e., type of rewards, percentages, special conditions (for example, 5% cash back on gas stations during the first quarter of the year), and other such information sufficient to determine the nature and amount of a reward that would be earned in association with a transaction and/or any redemption conditions). In some embodiments, the information about the rewards programs may be input by a user (e.g., via computing device 120).

At block 420, the system (e.g., via rewards management device 110) may receive user rewards preferences associated with the tokenized financial account number. For example, in some embodiments, rewards management device 110 may receive user rewards preferences from computing device 120. In some embodiments, a user may input user rewards preferences into computing device 120 via a software application that allows the user to specify relative priorities of rewards. For example, a user may specify that generally, the user prefers 1% cash back over 1 air mile per dollar spent, but that if the air mile per dollar of a transaction account exceeds a specified threshold (e.g., 3 air miles per dollar spent), then the user may then prefer the card that receives the air miles. According to some embodiments, rewards management device 110 may reduce the value of each reward offered by each card to a common unit of comparison. For example, a common unit of comparison may be "value in dollars per $100 spent." In a case where a user has three credit cards, where credit card A offers 2% cash back on all purchases, credit card B offers 1% cash back on all purchases and 5% cash back on purchases made at gas stations during a specified portion of the calendar year, and credit card C offers 2 air miles per dollar spent, it may not be immediately obvious which card would offer the best benefit for a given transaction. Thus, in this example, rewards management device 110 may translate each reward into a common unit of "value in dollars per $100 spent." Accordingly, in this example, rewards management device 110 may determine that the reward value offered by credit card A is $3.00, the reward value offered by credit card B is $1.50 if the transaction does not take place at a gas station during the specified time frame or $7.50 if it does, and that the reward value offered by credit card C is also $3.00. According to some embodiments, rewards management device 110 may determine the identity of the merchant or the type of merchant (e.g., gas station, grocery store, etc.) by using the merchant category code (MCC) that is part of the transaction authorization request generated by merchant POS terminal 130 based on the attempted transaction. Thus, rewards management device 110 may determine whether any rewards conditions (e.g., 5% cash back for purchases made in first quarter at gas stations) by determining one or more of the type of merchant at which the attempted purchase is being made (e.g., based on the MCC code), the identification of the merchant (e.g., the name of the store, for example based on correlating the MCC code with location data or other known data), the location (e.g., by receiving location data from computing device 120 (e.g., a mobile device) associated with the user of the credit card), the date and time (e.g., determined from the timestamp of the purchase request), and/or SKU data obtained from, for example, receiving a picture of the receipt and performing image recognition on the receipt to determine the purchased items and prices and correlating the items with categories. According to some embodiments, when purchasing a plane ticket, the purchase request may include the destination city and city of origin associated with the purchased flight. In some embodiments, rewards management device 110 may convert air miles (or other non-monetary rewards) to a monetary sum by comparing the air miles to the price of goods. So, for example, if a flight that can be purchased with 30,000 air miles costs $300 on the open market, rewards management device 110 may infer that the monetary value of an air mile is $0.01, and thus a reward of 2 air miles per dollar applied to an expenditure of $150 would be equivalent to a total of $3.00 in monetary value. According to some embodiments, rewards management device 110 may obtain cost information (e.g., the cost of a flight in dollars and air miles) from one or more websites or merchant servers to use in making such determinations. In some embodiments, rewards management device 110 may automatically intermittently update this cost information (e.g., daily, weekly, etc.). In some embodiments, a user may input a weighting preference to make adjustments to the valuations. For example, a user may input that they value air miles twice as much as cash, in which case rewards management device 110 may utilize this user-specified weighting to instead determine that the value of the air miles from the transaction would instead be a value of $6.00 to the user. In some embodiments, a user may input preferences relating to certain minimums or time frames of use in relation to a card. For example, a user may specify that they want to use a first credit card until they have spent a predetermined amount (e.g., the first $100), or that they want to use a particular card for a predetermined time (e.g., the next month). In some embodiments, a user may input preferences for using certain credit cards with particular merchants or types of merchants. For example, a user may specify that they prefer to use a first card at gas stations and a second card at grocery stores. In some embodiments, a user may input preferences for using one or more credit cards when traveling for work. In some embodiments, system 100 may determine that a user is traveling for work by, for example, tracking the GPS location of computing device 120 associated with the user and possibly cross-referencing the location against calendar entries that contain information that indicates the user is taking a work trip during the time in question. In some embodiments, if system 100 determines that the user is far away from home (e.g., based on location data of computing device 120), system 100 may initiate a message or prompt to be sent to computing device 120 of user that may ask whether they are traveling for work and the user may input a response that may indicate whether they are on a work trip or not. According to some embodiments, such a prompt may be presented after a credit card or tokenized credit card has been presented for payment in accordance with embodiments of the present disclosure. Thus, in some embodiments, upon receiving a purchase request generated from a user's credit card, system 100 may ping computing device 120 associated with user to determine the user's location by obtaining location data (e.g., GPS data). According to some embodiments, rewards management device 110 may automatically select a card to use in the transaction by selecting the card associated with the highest determined rewards value based on the user preferences. In some embodiments, rewards management device 110 may cause the determined values to be presented to the user so that the user may make a selection of an associated financial account to use for the transaction.

At block 430, the system (e.g., via rewards management device 110) may receive, from a merchant POS terminal 130, a primary transaction authorization request generated by the merchant POS terminal 130 based on an attempted transaction made in association with the tokenized financial account number. For example, as will be understood by those of skill in the art, a user may input a tokenized financial account number to merchant POS terminal 130 in association with an attempted transaction by using, for example, near-field communication to convey the tokenized financial account number to the merchant POS terminal 130 from digital wallet 380 of computing device 120.

At block 440, the system (e.g., via rewards management device 110) may generate, based on the primary transaction authorization request and the plurality of financial account numbers, a plurality of provisional transaction authorization requests. According to some embodiments, each of the plurality of provisional transaction authorization requests may correspond to one of the plurality of payment account numbers. For example, when a user submits a tokenized financial account number to the merchant POS terminal 130 in association with a transaction, the merchant POS terminal 130 may generate a primary transaction authorization request that represents a request to a financial service provider or card issuer to either authorize or deny the attempted transaction in association with the tokenized financial account number, which merchant POS terminal 130 may transmit to rewards management device 110 for processing. Upon receiving the primary transaction authorization request, rewards management device 110 may determine a plurality of financial account numbers that are associated with the tokenized financial account number (e.g., a plurality of credit cards) and may then generate a corresponding plurality of provisional transaction authorization requests for each financial account number. For example, if rewards management device 110 determines that the tokenized financial account number is associated with a user having credit cards A, B and C, then rewards management device 110 may generate three provisional transaction authorization requests, each of which that correspond to one of credit card A, B, or C.

At block 450, the system (e.g., via rewards management device 110) may transmit the plurality of provisional transaction authorization requests to one or more payment authorization servers. For example, to continue on with the previous case, if credit cards A, B and C each come from a different card issuer, rewards management device 110 may send a provisional transaction authorization request to a first payment authorization server 140a, a second payment authorization server 140b and a third payment authorization server 140c, respectively, where each of the payment authorization servers 140a,b,c correspond to a respective card issuer. Each provisional transaction authorization request may include the credit card number and the transaction information (i.e., amount of transaction, merchant category code, timestamp, etc.). In some embodiments, the provisional transaction authorization request may appear to a payment authorization server to be the same as a traditional payment authorization request that would have been generated if the associated credit card had just been swiped at merchant POS terminal 130 to begin with. In some embodiments, the provisional transaction authorization request may include data that indicates that the provisional transaction authorization request is originating from rewards management device 110. As will be understood by those of skill in the art, the respective payment authorization servers 140 may determine whether the attempted transaction would be authorized and if so, may each generate a provisional transaction authorization to send back to rewards management device 110 in response. If one or more payment authorization servers 140 determine that the attempted transaction would not be authorized (e.g., because the user is over their credit limit on a particular credit card), then the payment authorization server (e.g., 140a) may generate a transaction rejection message to send back to rewards management device 110 in response, which may indicate that the attempted transaction has been denied with respect to that financial account/credit card. According to some embodiments, one or more of the provisional transaction authorizations generated by the payment authorization servers 140 may include a respective rewards bid that the card issuer may make based on, for example the nature of the attempted transaction and/or information about the consumer (e.g., prior purchasing history of customer, whether the customer pays on time, whether the card issuer has been losing the customer's business over time, whether the customer's purchase volume has been increasing or decreasing, profitability of the customer (e.g., institutionally), customer's fit with a target demographic or profile, credit performance of customer's segment (e.g., based on demographics, behavior, and/or location), etc.). For example, if credit card A normally offers 2% cash back on all purchases, the card issuer associated with credit card A may decide that, based on one or more of the amount of the transaction, the merchant associated with the transaction or data associated with the customer associated with the transaction (e.g., the customer's payment history, average balance, credit score, and the like), that for this particular transaction, the card issuer would be willing to offer the customer 3% cash back instead of the usual 2% cash back. Accordingly, the provisional transaction authorization generated by the payment authorization server 140 associated with the issuer of credit card A may include a rewards bid of 3% cash back in this example. According to some embodiments, merchant POS terminal 130 may transmit data additional purchase data that may be used by payment authorization servers 140 in determining a rewards bid to offer, such as SKU data that indicates the items that are being purchased by the customer. For example, a particular card issuer may, for example, offer a higher reward for one type of item being purchased than another.

At block 460, the system (e.g., via rewards management device 110) may receive a plurality of provisional transaction authorizations from the one or more payment authorization servers. According to some embodiments, and as described above, each of the plurality of provisional transaction authorizations may correspond to one of the plurality of payment account numbers and may include a respective rewards bid associated with the attempted transaction. Thus, in some embodiments, rewards management device 110 may receive a plurality of provisional transaction authorizations that each have an associated rewards bid. In some embodiments, a rewards bid may replace the typical reward offered by a credit card (or other financial account) with a reward that may be applied to only the pending transaction. Rewards management device 110 may calculate the relative values of the received rewards bids in a manner similar to that as described previously above to allow for a comparison of the value of each rewards bid. In some embodiments, a rewards bid may represent a rewards offer comprising one or more of a cash back amount or percentage, a number of travel mile (such as air miles) credits, or a number of rewards points offered in association with use of a particular payment account for the attempted transaction.

At block 470, the system (e.g., via rewards management device 110) may select a preferred payment account number based on the user rewards preferences and the respective rewards bids associated with the plurality of provisional transaction authorizations. According to some embodiments, selecting the preferred payment account number may comprise automatically selecting, as the preferred payment account number, a payment account associated with a respective rewards bid having a highest value from among the respective rewards bids associated with the plurality of provisional transaction authorizations. In some embodiments, the highest value may be determined based on the user rewards preferences. For example, as described above, in some embodiments, rewards management device 110 may be configured to determine the value of each rewards bid (e.g., the value in dollars) in relation to the attempted transaction. In some embodiments, the determined values may be modified based on the rewards preferences if the user has specified a relative value as between two types of rewards (e.g., the user specifies that they value air miles twice as much as cash back). In some embodiments, based on the determined values and the user rewards preferences, the system may automatically select the payment account or credit card with the highest determined rewards return as being the preferred payment account number. According to some embodiments, the preferred payment account number may be one of the plurality of payment account numbers that corresponds to a provisional transaction authorization. In other words, if the system (e.g., rewards management device 110) receives a transaction rejection message in relation to a particular credit card (or other payment account) then rewards management device 110 may eliminate that credit card from consideration when selecting the preferred payment account number.

In some embodiments, selecting the preferred payment account number may comprise transmitting information indicative of the respective rewards bids corresponding to the provisional transaction authorizations and the preferred payment account to a user device (e.g., computing device 120) and receiving a selection of a verification of the preferred payment account number from the user device. For example, in some embodiments, the preferred payment account number may not be automatically selected by the system, but rather, may be selected by the user via user input (e.g., via user input to software application of reward management device 110) after the user is presented with the options (e.g., the provisionally authorized credit cards and their associated rewards bids).

At block 480, the system (e.g., via rewards management device 110) may transmit a transaction authorization message to the merchant POS terminal to authorize the attempted transaction. According to some embodiments, rewards management device 100 may transmit the transaction authorization message based on a provisional transaction authorization of the plurality of provisional transaction authorizations that correspond to the preferred payment account number. According to some embodiments, rewards management device 110 may generate a transaction authorization message associated with the preferred payment account number upon the system determining the preferred payment account number or upon receiving a user selection of the preferred payment account number. For example, if the system determines credit card B has the highest (or, based on user preferences, most preferred) value rewards bid such that credit card B is selected as the preferred payment account number, then rewards management device 110 may generate a transaction authorization message authorizing the transaction to be performed using credit card B. The transaction authorization message may be transmitted to merchant POS terminal 130 and/or payment authorization server 140*b* for processing. Rewards management device 110 may generate one or more payment cancellation messages corresponding to the financial accounts that were provisionally authorized but not selected as the preferred payment account number. For example, if credit cards A and C are not selected as the preferred payment account number, rewards management device 110 may generate payment cancellation messages to that may be transmit to payment authorization servers 140*a* and 140*c*, respectively, to cancel the previously provisionally authorized transactions. In this way, the system may determine which credit cards are authorized for use, gather rewards bids associated with each credit card, select a preferred credit card based on an evaluation of the rewards bids in view of any relevant user rewards preferences, and authorize the transaction to be completed using the selected preferred credit card while cancelling the provisionally authorized transactions to the remaining unselected credit cards. Accordingly, in some embodiments, method 400 may further include transmitting the payment authorization message to a first server 140*a* of the one or more payment authorization servers 140, the first server being associated with the preferred payment account and transmitting one or more payment cancellation messages to one or more second servers 140b,c of the one or more payment authorization servers, the one or more second servers 140b,c being associated with payment accounts corresponding to provisional transaction authorizations other than the preferred payment account.

Figure 5:
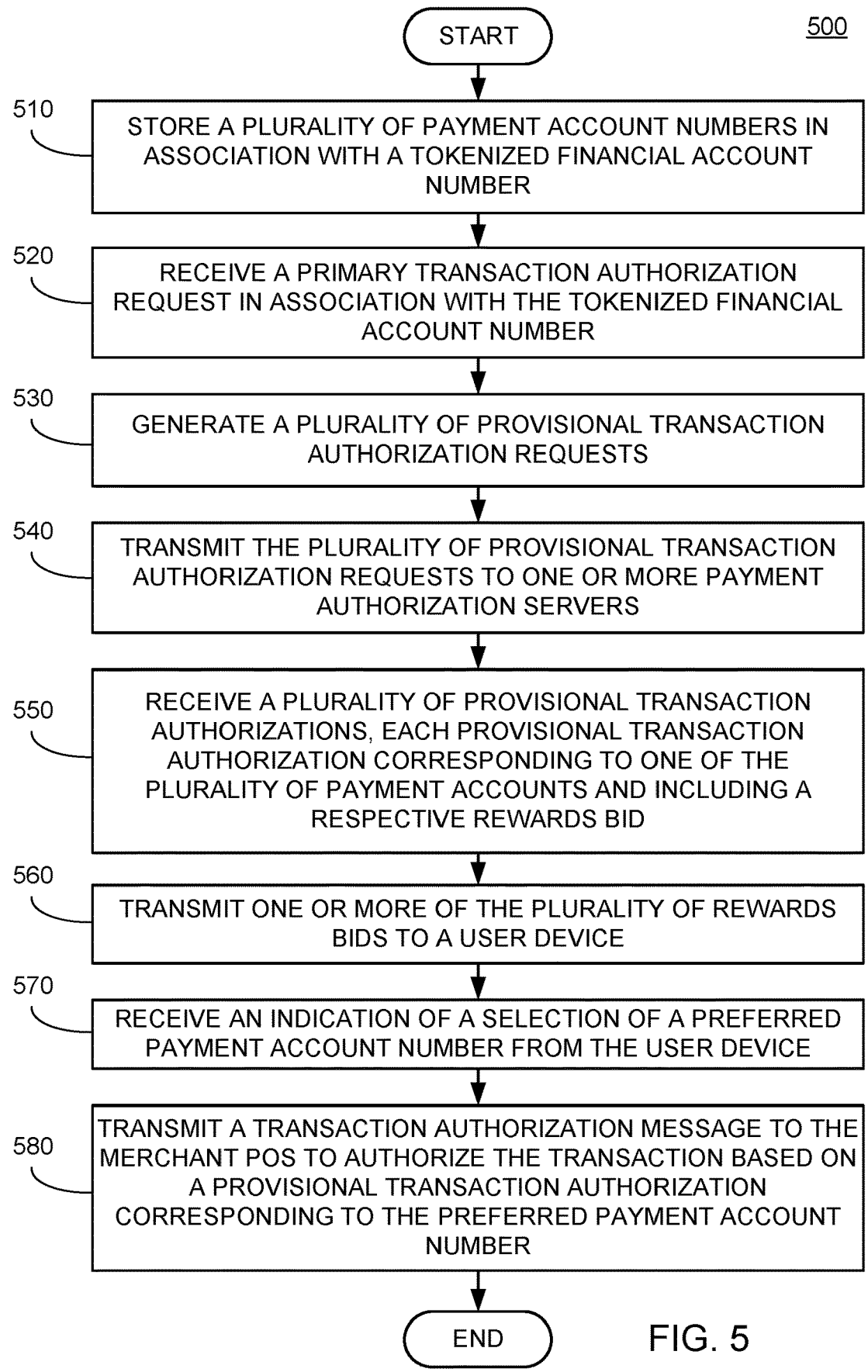
FIG. 5 is a flowchart of another exemplary method for providing rewards-based payment method selection.

FIG. 5 shows a flowchart of another exemplary method 500 for providing rewards-based payment method selection. Method 500 may be performed by rewards management device 110 using processor 210 to execute memory 230. In some embodiments, steps of method 500 may be delegated to other elements in system 100, such as the computing devices 120, merchant POS terminal 130 and/or payment authorization servers 140 (e.g., 140a-n). Following method 500, a customer may optimize the rewards received in association with a purchase in response to system 100's facilitation of the placement of rewards bids by a plurality of payment card issuers in association with the transaction.

At block 510, the system (e.g., via rewards management device 110) may store a plurality of payment account numbers in association with a tokenized financial account number in a manner similar to that described above with respect to block 410. According to some embodiments, the tokenized financial account number may represent a proxy for the plurality of payment account numbers. For example, as described above, a tokenized financial account number may be associated with a plurality of stored payment account numbers.

At block 520, the system (e.g., via rewards management device 110) may receive, from a merchant POS terminal, a primary transaction authorization request generated by the merchant POS terminal based on an attempted transaction made in association with the tokenized financial account number in a manner similar to that described above with respect to block 430.

At block 530, the system (e.g., via rewards management device 110) may generate, based on the primary transaction authorization request and the plurality of financial account numbers, a plurality of provisional transaction authorization requests in a manner similar to that described above with respect to block 440. According to some embodiments, each of the plurality of provisional transaction authorization requests may represent a request to a payment authorization server 140 to provide an indication of whether a payment account number associated with the provisional transaction authorization request would be authorized for use to complete the attempted transaction. For example, as will be understood by those of skill in the art, payment authorization server 140 may apply a set of rules to the transaction data (e.g., amount, merchant category code, timestamp, location data, etc.) and customer profile (e.g., available credit line, payment history, etc.) to determine whether or not to authorize the attempted transaction.

At block 540, the system (e.g., via rewards management device 110) may transmit the plurality of provisional transaction authorization requests to one or more payment authorization servers 140 in a manner similar to that described above with respect to block 450.

At block 550, the system (e.g., via rewards management device 110) may receive a plurality of provisional transaction authorizations from the one or more payment authorization servers 140. According to some embodiments, each of the plurality of provisional transaction authorizations may correspond to one of the plurality of payment account numbers as described previously above.

At block 560, the system (e.g., via rewards management device 110) may receive a plurality of rewards bids from the one or more payment authorization servers 140. According to some embodiments, each rewards bid of the plurality of rewards bids may be associated with a respective payment account number of the plurality of payment account numbers that corresponds to one of the plurality of provisional transaction authorizations. For example, for each credit card owned by the customer, the respective credit card issuer may generate a rewards bid associated with the credit card for application to the attempted transaction and the respective payment authorization server 140 may incorporate the rewards bid into the provisional authorization sent back to the rewards management device 110. In some embodiments, a rewards bid may represent a rewards offer comprising one or more of a cash back amount, a number of travel mile credits, an account credit, or a number of rewards points offered in association with use of a particular payment account for the attempted transaction.

According to some embodiments, receiving the plurality of rewards bids may include steps of receiving at least a first rewards bid associated with a first payment account number from a first payment authorization server 140a and a second rewards bid associated with a second payment account number from a second payment authorization server 140b, transmitting the second rewards bid to the first payment authorization server 140a, transmitting the first rewards bid to the second payment authorization server 140b, and receiving one or more of an updated first rewards bid associated with the first payment account and an updated second rewards bid associated with the second payment account from the respective payment authorization servers 140a,b. In other words, in some embodiments, the system may allow one or more credit card issuers to see the rewards bids of competing credit card issuers to allow the credit card issuers to revise their rewards bid. For example, if a rewards bid for credit card A is 3% cash back on the purchase and the rewards bid for credit card B is 3.5% cash back on the purchase, the credit card issuer of credit card A may receive the rewards bid of 3.5% offered by the card issuer of credit card B and may then decide to revise its rewards bid to, for example 4.0% cash back, whereas credit card B may not change its offer upon learning that the first card issuer only initially offered 3.0%. According to some embodiments, this exchange of rewards bids may occur multiple times to allow for multiple revisions in rewards bids offers, thereby creating a real-time competitive rewards bid auction. In some embodiments, the rewards bids may be finalized after a predetermined number of bids or bid revisions. In some embodiments, the rewards bids may be finalized after a predetermined amount of time has passed.

At block 570, the system (e.g., via rewards management device 110) may transmit one or more of the plurality of rewards bids to a user device (e.g., computing device 120). For example, rewards management device 110 may notify computing device 120 that the offered rewards bid for credit card A is 4.0% cash back, the offered rewards bid for credit card B is 3.0% and the offered rewards bid for credit card C is 3 air miles per dollar spent. In some embodiments, the values of the respective rewards bids may be displayed by computing device 120 to the user based on the transaction data (e.g., transaction amount, merchant identity, timestamp, etc.), so that the user may make a selected of a preferred payment account to use for the transaction.

Although this method describes transmitting one or more of the plurality of rewards bids to a user device (e.g., computing device 120), it should be understood that in some embodiments, the one or more rewards bid may be alternatively transmitted to merchant POS terminal 130 for display to the user. For example, a user may be checking out at a self-checkout kiosk, and the self-checkout kiosk may be configured to display the one or more of the plurality of rewards bids to the user and allow the user to input a selection of a preferred card.

At block 580, the system (e.g., via rewards management device 110) may receive an indication of a selection of a preferred payment account number from among the plurality of payment account numbers from the user device (e.g., computing device 120). According to some embodiments, the preferred payment account number may correspond to a payment account number that is associated with one of the one or more of the plurality of rewards bids.

At block 580, the system (e.g., via rewards management device 110) may transmit a transaction authorization message to the merchant POS terminal 130 to authorize the attempted transaction. According to some embodiments, transmitting the transaction authorization message may be based on a provisional transaction authorization corresponding to the preferred payment account number. For example, as previously described above, in some embodiments, the system may be configured to only allow a user to select a preferred payment account from the payment accounts that received a provisional transaction authorization (as opposed to a transaction rejection message).

In some embodiments, method 500 may further include transmitting the payment authorization message to a first server 140a of the one or more payment authorization servers 140 and transmitting one or more payment cancellation messages to one or more second servers 140b of the one or more payment authorization servers 140. According to some embodiments, the first server 140a may be associated with the preferred payment account and the one or more second servers 140b may be associated with payment accounts corresponding to provisional transaction authorizations other than the preferred payment account. According to some embodiments, the one or more payment cancellation messages may represent respective instructions to cancel a provisional authorization of the attempted transaction in association with a corresponding payment account number.

Figure 6:
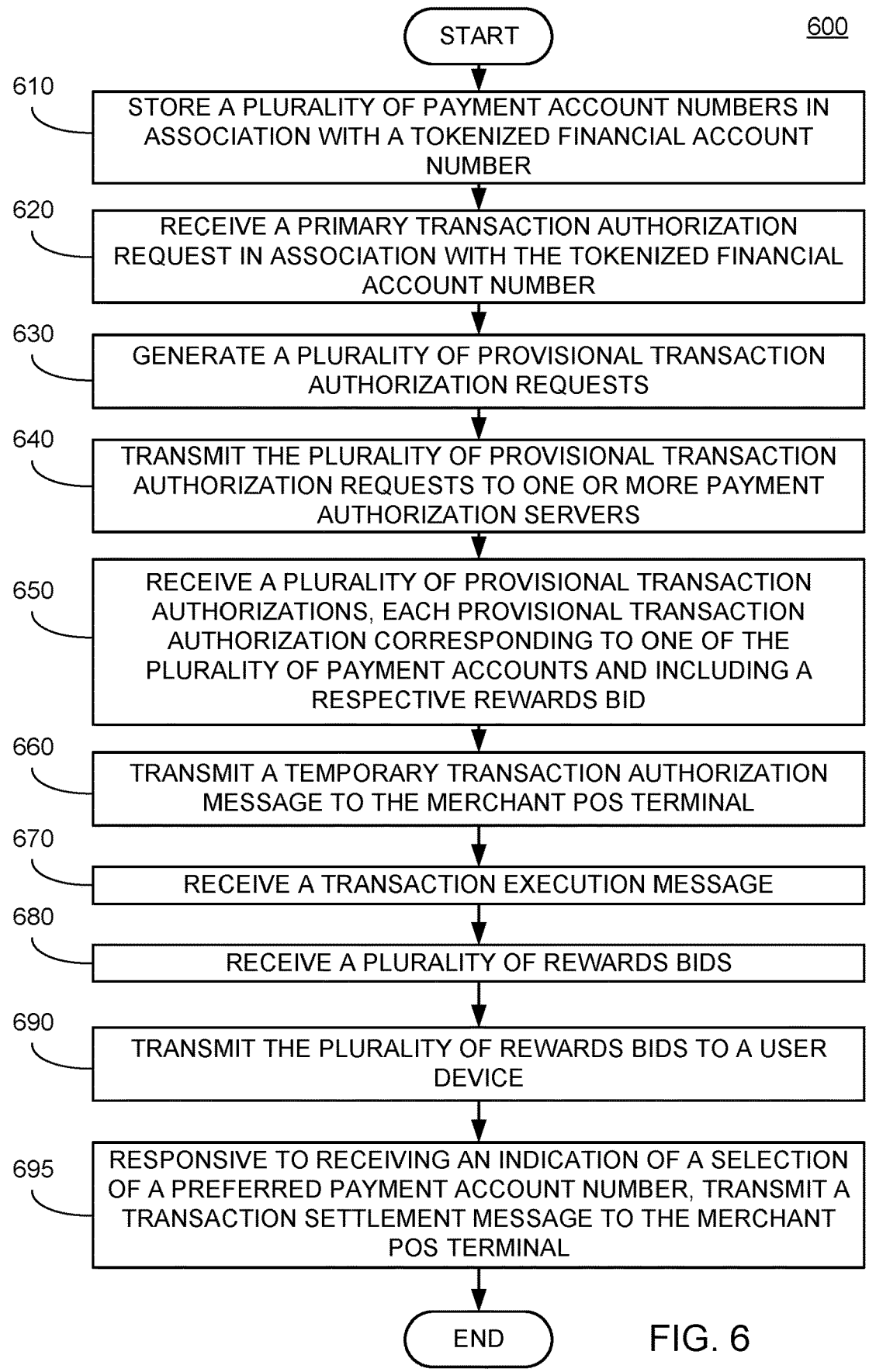
FIG. 6 is a flowchart of yet another exemplary method for providing rewards-based payment method selection.

FIG. 6 shows a flowchart of another exemplary method 600 for providing rewards-based payment method selection. Method 600 may be performed by rewards management device 110 using processor 210 to execute memory 230. In some embodiments, steps of method 600 may be delegated to other elements in system 100, such as the computing devices 120, merchant POS terminal 130 and/or payment authorization servers 140 (e.g., 140*a*-*n*). Following method 600, a customer may optimize the rewards received in association with a purchase in response to system 100's facilitation of the placement of rewards bids by a plurality of payment card issuers in association with the transaction.

At block 610, the system (e.g., via rewards management device 110) may store a plurality of payment account numbers in association with a tokenized financial account number in a manner similar to that described above with respect to block 410.

At block 620, the system (e.g., via rewards management device 110) may receive, from a merchant POS terminal, a primary transaction authorization request generated by the merchant POS terminal based on an attempted transaction made in association with the tokenized financial account number in a manner similar to that described above with respect to block 430.

At block 630, the system (e.g., via rewards management device 110) may generate, based on the primary transaction authorization request and the plurality of financial account numbers, a plurality of provisional transaction authorization requests in a manner similar to that described above with respect to block 440.

At block 640, the system (e.g., via rewards management device 110) may transmit the plurality of provisional transaction authorization requests to one or more payment authorization servers in a manner similar to that described above with respect to block 450.

At block 650, the system (e.g., via rewards management device 110) may receive a plurality of provisional transaction authorizations from the one or more payment authorization servers in a manner similar to that described above with respect to block 550. According to some embodiments, each of the plurality of provisional transaction authorizations may correspond to one of the plurality of payment account numbers.

At block 660, the system (e.g., via rewards management device 110) may transmit a temporary transaction authorization message to the merchant POS terminal to authorize the attempted transaction. According to some embodiments, the transmission of the temporary transaction authorization message may be based on the plurality of provisional transaction authorizations. For example, a rewards management device 110 may generate a temporary transaction authorization message in response to receiving at least one provisional transaction authorization from the one or more payment authorization servers 140 because the existence of at least one provisional transaction authorization may indicate that the transaction is capable of being executed by at least one payment account. In some embodiments, the temporary transaction authorization message may not specify a payment account number. For example, in some embodiments, the temporary transaction authorization may just indicate that there is at least one payment account that will authorize the transaction and therefore the transaction may proceed. In some embodiments, the temporary transaction authorization message may specify a default payment account number corresponding to a provisional transaction authorization of the plurality of provisional transaction authorizations. For example, if three credit cards have been provisionally authorized to carry out the transaction, rewards management device 110 may select one of the provisionally authorized credit cards to be included in the temporary transaction authorization message. In some embodiments, the default payment account number may be automatically selected based on stored user preferences. In some embodiments, the temporary transaction authorization message may provide an indication to the merchant POS terminal 130 that the transaction will be authorized (e.g., by virtue of the fact that the system has received at least one provisional transaction authorization), but that the final payment method has not yet been selected. This may allow a customer to quickly proceed through a checkout line of a merchant without holding up the line to make a selection of a preferred payment card. Thus, the use of the temporary transaction authorization message may allow a user to make a purchase at a merchant POS terminal 130 and exit the store with their goods, while allowing the decision of the preferred payment method to be made after the fact. This delay may also allow the competitive bidding process between payment card issuers to carry on for an extended period of time to allow for more bids to be generated.

At block 670, the system (e.g., via rewards management device 110) may receive a transaction execution message from merchant POS terminal 130 indicating that the attempted transaction has been executed. For example, as described above, the temporary transaction authorization message provided to merchant POS terminal 130 may provide merchant POS terminal 130 with assurances that the transaction is authorized and will be executed at a future time based on a selection of one of one or more provisionally authorized payment methods.

At block 680, the system (e.g., via rewards management device 110) may receive a plurality of rewards bids associated with the payment account numbers corresponding to the plurality of provisional transaction authorizations. For example, in some embodiments, a customer may input a tokenized financial account number at merchant POS terminal 130 to initiate a transaction, and based on merchant POS terminal's 130 receipt of a temporary transaction authorization message, merchant POS terminal 130 may provisionally process the payment for the purchase to allow the customer to check out and leave the store, and the customer may then be presented (e.g., via a software application on computing device 120) with one or more payment methods (e.g., provisionally authorized credit cards) and their associated rewards bids from which to select a preferred payment account number (i.e., preferred credit card).

According to some embodiments, receiving a plurality of rewards bids may include receiving, from the one or more payment authorization servers 140, respective initial rewards bids associated with each payment account number that corresponds to a provisional transaction authorization. In other words, each provisional transaction authorization may have an associated initial rewards bid that is associated with the corresponding payment account number (e.g., credit card number). Each initial rewards bid may be received from a respective originating payment authorization server 140 from among the one or more payment authorization servers 140a-n. For example, each credit card may be from a different credit card issuer which may be processed by a different payment authorization server 140. The method may further include transmitting, for each initial rewards bid, the initial rewards bid to one or more competitor payment authorization servers 140. The competitor payment authorization servers 140 may be a subset of the one or more payment authorization servers 140 that exclude the respective originating payment authorization server 140. In other words, if a customer has credit cards A, B, and C, rewards management device 110 may receive a provisional transaction authorization from a first payment authorization servers 140, a second payment authorization server 140b and a third payment authorization server 140c, associated with credit cards A, B, and C respectively. Each provisional transaction authorization may include a respective initial rewards bid. Then, in some embodiments, the initial rewards bids associated with credit cards B and C may be sent the first payment authorization server 140a, the initial rewards bids associated with credit cards A and C may be sent to the second payment authorization server 140b, and the initial rewards bids associated with credit cards A and B may be send to the third payment authorization server 140c, such that each credit card issuer may view the rewards bids from its competitors. The method may include receiving, from the one or more payment authorization servers 140, one or more updated rewards bids, wherein each updated rewards bid corresponds to an initial rewards bid that has been updated following the transmission of one of the one or more of the initial rewards bids. In some embodiments, method may further include transmitting the updated rewards bids to the user device. Thus, according to some embodiments, the system may allow the card issuers to see competing rewards bids and update their rewards bids to provide competition among the card issuers. According to some embodiments, this process of providing bids to competitors and allowing rewards bids to be revised and updated may occur multiple times before the rewards bids are finalized.

At block 690, the system (e.g., via rewards management device 110) may transmit the plurality of rewards bids corresponding to the provisional transaction authorizations to a user device (e.g., computing device 120) in a manner similar to that described above with respect to block 570.

At block 695, the system (e.g., via rewards management device 110) may transmit a transaction settlement message to the merchant POS terminal 130. According to some embodiments, transmission of the transaction settlement message may be based on a provisional transaction authorization corresponding to the preferred payment account number. In some embodiments, transmission of the transaction settlement message may occur in response to receiving an indication of a selection of a preferred payment account number from among the plurality of payment account numbers that correspond to the rewards bids from the user device. In other words, if the user selects credit card A as the preferred payment account number from a group comprising credit cards A, B, and C, then rewards management device 110 may generate a transaction settlement message to merchant POS terminal 130 indicating that credit card A is the selected payment method and the transaction that was authorized by the temporary transaction authorization message should be completed and settled using credit card A. As will be understood by those of skill in the art, each credit card that provisionally authorizes the transaction will temporarily remove available credit from the account associated with the card, but when one card is selected to execute the transaction, that card will have the transaction amount charged against the account whereas the non-selected cards will have the removed available credit restored upon the provisional authorizations being cancelled by cancellation messages. In some embodiments, the receipt of the indication of a selection of a preferred payment account number may occur after receiving the transaction execution message. For example, as previously described above, the system may allow a user to check out at a merchant POS terminal 130 before having made a selection of which credit card account to charge the transaction such that the transaction may be executed in the sense that the merchant has allowed the purchase, but may not yet be fully complete in the sense that the charge has not yet been assigned to a particular payment account. Accordingly, in some embodiments, the transaction settlement message may include an instruction to the merchant POS terminal to charge the transaction to the preferred payment account number.

In some embodiments, method 600 may further include initiating an expiration timer in response to receiving the transaction execution message. For example, in some embodiments, the system may provide the user with a predetermined amount of time following checking out at the merchant POS terminal 130 by which the user must make a selection of a preferred payment account number, or else the system may automatically select a preferred payment account number. Thus, in some embodiments, method 600 may further include, in response to the expiration timer expiring prior to receiving the indication of the selection of the preferred payment account number, automatically selecting (e.g., by rewards management device 110), as the preferred payment account number, a default payment account number from among the plurality of payment account number. According to some embodiments, method 600 may further include transmitting a transaction settlement message to the merchant POS terminal 130, for example, following a selection of a preferred payment account number. In some embodiments, the transmission of the settlement message may be based on a provisional transaction authorization corresponding to the preferred payment account number. For example, the settlement message may incorporate the provisional transaction authorization received from the payment authorization server 140 that corresponds to the selected preferred payment account number. In some embodiments, rewards management device 110 and/or merchant POS terminal 130 may generate and transmit a payment authorization message to the corresponding payment authorization server 140 to cause the corresponding payment authorization server 140 to execute the transaction and debit the associated financial account with the cost of the purchase made at the merchant POS terminal 130.

Although the preceding description generally describes rewards management device 110 serving as an intermediary between merchant POS terminal 130 and the plurality of payment authorization servers 140, it should be understood that much or all of the functionality performed by rewards management device 110 may be alternatively carried out by merchant POS terminal 130 and/or computing device 120.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes an examples of a typical user flow pattern. They are intended solely for explanatory purposes and not in limitation. A user may have three credit cards that may each offer different rewards. For example, credit card A may offer 2% cash back on all purchases, credit card B may offer 1% cash back on all purchases but 5% cash back on purchases at select merchants based on the time of year, and credit card C may offer 2 air miles per dollar spent. The user may have a smart phone (e.g., computing device 120) that has a digital wallet and a mobile application that allows the user to input preferences for rewards. For example, the user may input that they currently value air miles twice as much as cash back because they are saving for an airfare. The digital wallet may store a tokenized credit card number that represents the set of credit cards A, B, and C. The user may make a purchase at a store (e.g., via merchant POS terminal 130) by providing the tokenized credit card number to merchant via near-field communication. The store (e.g., via merchant POS terminal 130) may transmit the tokenized credit card number to a processing server (e.g., rewards management device), which may then identify credit cards A, B and C based on the received tokenized credit card number. The processing server may then generate and send payment authorization requests to the payment authorization servers 140 (e.g., payment authorization servers 140a,b,c) associated with credit cards A, B and C and receive provisional authorizations that indicate that the user is authorized to use any of the three credit cards to complete the purchase. Likewise, the user may alternatively swipe credit card A at the merchant and upon receiving the authorization request, the system (e.g., rewards management device 110) may, based on the association between credit cards A, B and C, nonetheless generate and send payment authorization requests to all three credit card issuers. The payment authorization servers may, in response to receiving information about the attempted transaction (e.g., amount, merchant, time, etc.) and information about the customer (e.g., payment history, current balance, etc.), provide a specialized rewards bid for the transaction. For example, whereas credit card A normally provides 2% cash back on all purchases, the credit card issuer may decide that it is worth offering 3% cash back for this purchase. The system may receive rewards bids associated with one or more of the credit cards and then may select the credit card that is offering the best (or, based on the user preferences, most preferred) reward in association with the purchase and then may execute the transaction with the selection card. In some embodiments, prior to selecting the best credit card, the system (e.g., via rewards management device 110) may provide the offered rewards bids to the competing card issuers to allow for one or more rounds of updating bids to provide a competitive auction. In some embodiments, instead of automatically selecting the best credit card, the system (e.g., via rewards management device 110) may provide the user with the option to select from the group of authorized credit cards with the associated rewards bids (e.g., via computing device 120 or merchant POS terminal 130). In some embodiments, the system may even allow the user to make this selection after the user has checked out and left the store. For example, the system may provide the user with 30 minutes to pick a credit card with which to finalize the purchase transaction before the system times out and automatically picks a credit card for them. In this way, the system may allow the user to make a considered choice of rewards following an auction-process that allows the card issuers to modify the rewards offered in association with the transaction without forcing the user to hold up the checkout line while the auction and credit card selections are being carried out.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A method of providing rewards-based payment method selection, the method comprising:
    storing a plurality of payment account numbers in association with a tokenized financial account number, each payment account number of the plurality of payment account numbers being associated with a purchase-based rewards program;
    receiving, from a merchant POS terminal, a primary transaction authorization request generated by the merchant POS terminal based on an attempted transaction made in association with the tokenized financial account number;
    generating, based on the primary transaction authorization request and the plurality of payment account numbers, a plurality of provisional transaction authorization requests, each of the plurality of provisional transaction authorization requests corresponding to one of the plurality of payment account numbers;
    transmitting, to a plurality of payment authorization servers, the plurality of provisional transaction authorization requests;
    receiving, from the plurality of payment authorization servers, a plurality of provisional transaction authorizations, each of the plurality of provisional transaction authorizations corresponding to a respective payment account number of the plurality of payment account numbers;
    transmitting, to the merchant POS terminal, a temporary transaction authorization message to authorize the attempted transaction;
    receiving a transaction execution message from the merchant POS terminal indicating that the attempted transaction has been executed;
    receiving, from the plurality of payment authorization servers, a plurality of initial rewards bids, each initial rewards bid associated with a respective provisional transaction authorization;
    transmitting each of the plurality of initial rewards bids to each of the plurality of payment authorization servers;
    receiving, from the plurality of payment authorization servers, one or more updated rewards bids based on a comparison of the plurality of initial rewards bids;
    normalizing the one or more initial rewards bids and/or the one or more updated rewards bids based on a common factor, wherein the common factor is the value of the rewards bid in dollars per $100 dollars spent;
    transmitting, to a user device, the one or more initial rewards bids and/or one or more updated rewards bids;
    determining a preferred payment account number from among the plurality of payment account numbers based on the one or more initial rewards bids and/or the one or more updated rewards bids; and
    transmitting, to the merchant POS terminal, a transaction settlement message including the preferred payment account number.

2. The method of claim 1, wherein the temporary transaction authorization message does not specify a payment account number.

3. The method of claim 1, wherein the temporary transaction authorization message specifies a default payment account number corresponding to the provisional transaction authorization of the plurality of provisional transaction authorizations, the default payment account number being automatically selected based on stored user preferences.

4. The method of claim 1, wherein the transaction settlement message includes an instruction to the merchant POS terminal to charge the attempted transaction to the preferred payment account number.

5. The method of claim 4, further comprising:
    initiating a timer; and
    automatically selecting the preferred payment account number in response to the timer expiring.

6. The method of claim 1, wherein determining the preferred payment account number from among the plurality of payment account numbers comprises:
    receiving, from the user device, an automatic selection of the preferred payment account number based on stored user preferences.

7. The method of claim 1, wherein determining the preferred payment account number from among the plurality of payment account numbers comprises:
    receiving, from the user device, a selection of the preferred payment account number based on an input from the user.

8. The method of claim 1, wherein determining the preferred payment account number from among the plurality of payment account numbers comprises:
    receiving, from the user device, a selection of the preferred payment account number from among the plurality of payment account numbers.

9. The method of claim 1, wherein normalizing the one or more initial rewards bids and/or the one or more updated rewards bids based on the common factor comprises assigning a monetary value to a non-monetary rewards bid.

10. The method of claim 1, further comprising:
    determining that at least one of the plurality of provisional transaction authorizations comprises a rejected transaction, and
    updating the plurality of payment account numbers associated with the tokenized financial account number by removing the payment account number associated with the rejected transaction for selection as the preferred payment account number in the attempted transaction.

11. The method of claim 1, further comprising:
    transmitting one or more cancellation messages to each of the payment authorization servers that:
        transmitted a provisional transaction authorization; and
        is not associated with the preferred payment account number.

12. The method of claim 1, further comprising:
    transmitting, to the merchant POS terminal, the one or more updated rewards bids.

* * * * *